(12) United States Patent
Nagata

(10) Patent No.: US 6,628,966 B1
(45) Date of Patent: Sep. 30, 2003

(54) PACKET COMMUNICATION CARD

(75) Inventor: Kimitaka Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/225,184

(22) Filed: Jan. 4, 1999

(51) Int. Cl.[7] .............................. H04B 1/38; H04M 1/00
(52) U.S. Cl. ...................... 455/557; 455/127; 455/343; 455/572
(58) Field of Search ................................. 455/127, 550, 455/556, 557, 558, 572, 573, 574, 575, 343, 344

(56) References Cited

U.S. PATENT DOCUMENTS

| | | | | |
|---|---|---|---|---|
| 5,711,012 A | * | 1/1998 | Bottoms et al. | ............ 455/557 |
| 5,845,217 A | * | 12/1998 | Lindell et al. | ............... 455/575 |
| 5,870,615 A | * | 2/1999 | Bar-On et al. | ............... 713/310 |
| 5,884,190 A | * | 3/1999 | Lintula et al. | ............... 455/556 |
| 5,903,849 A | * | 5/1999 | Selin et al. | .................. 455/557 |
| 5,956,651 A | * | 9/1999 | Willkie et al. | ............... 455/558 |
| 6,026,119 A | * | 2/2000 | Funk et al. | .................. 455/557 |
| 6,052,565 A | * | 4/2000 | Ishikura et al. | ............. 455/572 |
| 6,088,600 A | * | 7/2000 | Rasmussen | ................. 455/574 |

FOREIGN PATENT DOCUMENTS

| | | |
|---|---|---|
| GB | 2 325 119 A | 11/1998 |
| JP | 2-279032 | 11/1990 |
| JP | 5-130012 | 5/1993 |
| JP | 7-321726 | 12/1995 |
| JP | 8-101901 | * 4/1996 |
| JP | 9-130456 | 5/1997 |
| JP | 9-331574 | 12/1997 |
| WO | 96/21900 A1 | 7/1996 |

\* cited by examiner

*Primary Examiner*—Quochien Vuong
(74) *Attorney, Agent, or Firm*—Scully, Scott, Murphy & Presser

(57) ABSTRACT

A packet communication card enables consumption of a battery for a portable digital telephone to be reduced by changing supply power for the portable digital telephone in accordance with a state of the portable digital telephone. The pocket communication card which is connected to the portable digital telephone, and which is provided with a COM port necessary for implementing packet communication, is inserted into a data terminal equipment to be used. There is reduced consumption of the battery for the portable digital telephone by selecting to be changed one power source which is a power source of power sources being at least more than one for supplying power to the portable digital telephone in accordance with state of communication of the portable digital telephone. A switch implements change of supply power.

16 Claims, 4 Drawing Sheets

FIG. 2

| | |
|---|---|
| UP-SERIAL SIGNAL | SERIAL SIGNAL MEASURE FOR TRANSFERRING FROM CARD TO PORTABLE MEASURE |
| DOWN-SERIAL SIGNAL | SERIAL SIGNAL MEASURE FOR TRANSFERRING FORM PORTABLE MEASURE TO CARD |
| POWER SOURCE INSIDE-OUTSIDE DISCRIMINATION SIGNAL | SIGNAL FOR CHANGING SUPPLY POWER OF PORTABLE MEASURE INTO EITHER INSIDE OR OUTSIDE SIGNAL |
| EXTERNAL POWER SOURCE SUPPLY SIGNAL | TERMINAL FOR IMPLEMENTING SUPPLY POWER SOURCE OF PORTABLE MEASURE FROM EXTERNAL SIDE |

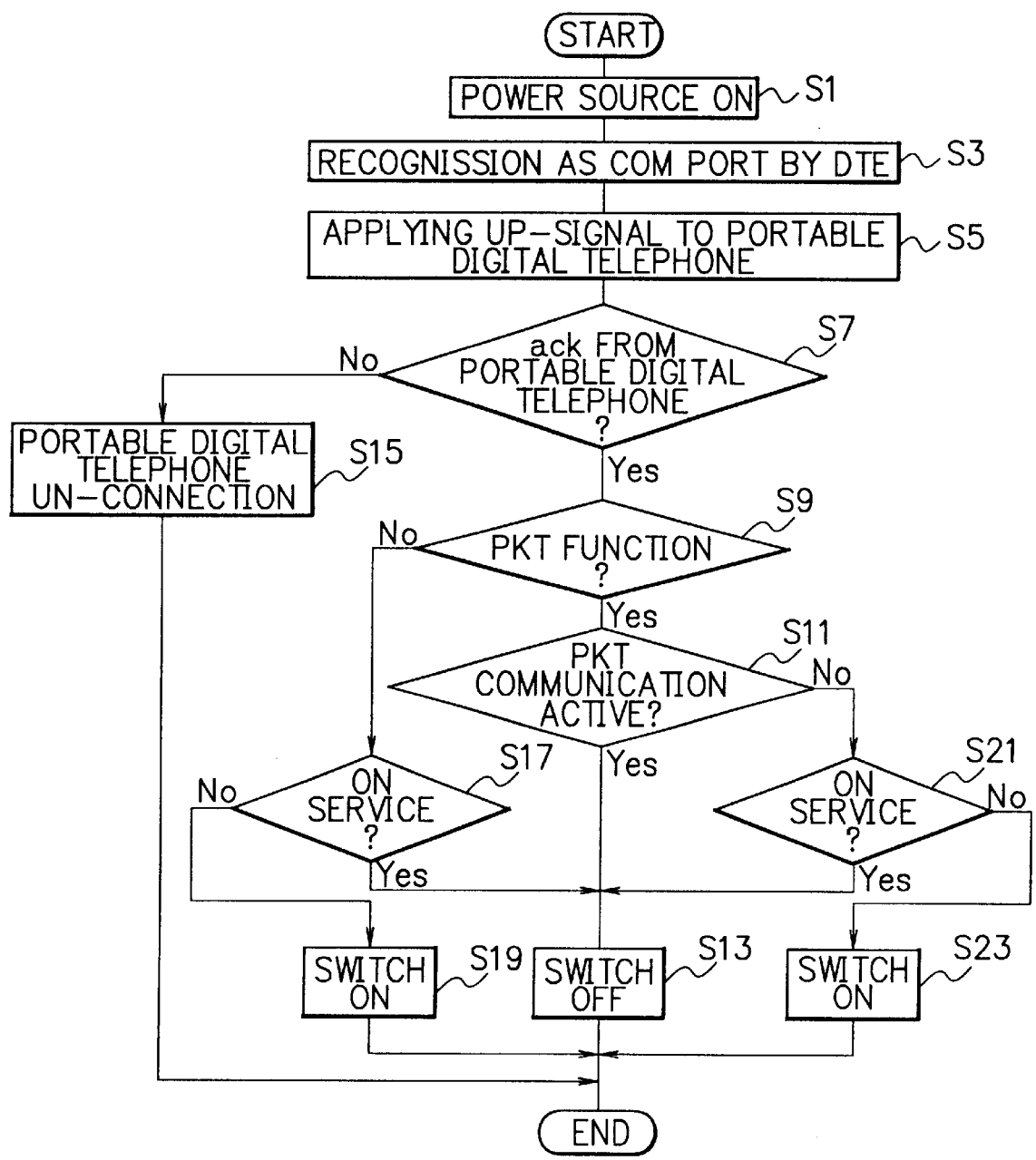

PACKET COMMUNICATION CARD

BACKGROUND OF THE INVENTION

The present invention relates to a packet communication card. More to particularly, this invention relates to the packet communication card which is connected to a portable digital telephone, and which is inserted into a data terminal equipment.

DESCRIPTION OF THE PRIOR ART

Formerly, there is well known a packet communication in which communication is implemented such that a data terminal equipment (hereinafter referred to as simply DTE) such as a note-type personal computer and so forth are connected to a portable digital telephone, by way of the packet communication using the portable digital telephone.

In this conventional packet communication, the packet communication is implemented while connecting the portable digital telephone, the packet communication card, and the DTE.

On the other hand, with respect to the portable digital telephone, there is required miniaturization and lightening in order to improve convenient property. For this reason, there is a limit concerning a battery which is to be loaded, thus capacity of the battery to be loaded becomes the problem in the portable digital telephone.

The Japanese Patent Application Laid-Open No. HEI 2-279032 discloses a portable digital telephone by way of the prior art in order to achieve the problem in terms of power source (battery) in the portable digital telephone.

According to this Prior Art, there is provided the first external power source input terminal and the second external power source input terminal connected to charging circuit by way of the input terminals of external power source of the portable digital telephone. There is connected the second external power source input terminal to the high frequency amplifying section of the receiving section and so fourth with the result that there is intended decrease of current consumption and there is prevented deterioration of characteristic of the reception sensitivity and so forth.

The Japanese Patent Application Laid-Open No. HEI 5-130012 discloses a portable digital telephone by way of the same prior art.

According to this Prior Art, there is intended to suppress unnecessary power consumption by supplying power source intermittently to the radio receiving circuit.

As described above, there is well known the portable digital telephone, the packet communication card, and the packet communication with DTE connected by way of the conventional packet communication. However, there is the problem that although the DTE or the packet communication card is of the condition that the DTE, or the packet communication card is capable of operating sufficiently, consumption of the battery of the portable digital telephone disables the packet communication from communicating. Because demand for miniaturization in relation to the battery of the portable digital telephone brings shortage of capacity.

Namely, since the power source of DTE differs from the supply power source toward the portable digital telephone, the packet communication using the packet communication card becomes impossible when the power source of the portable digital telephone is consumed.

In order to achieve the above problem there might be considered that it causes the power to be supplied to the portable digital telephone from only the DTE. However, there is established the upper limit in every DTE in terms of the power which is capable of supplying thereto by PCMC I A (Personal Computer Memory Card International Association) I/F applied for the packet communication card. In addition thereto, there is scarcely practical effect because the DTE requires the power degree which is incapable of being supplied from the DTE to the portable digital telephone during packet communicating (in particular, in active state of transmitting). Here PCMA I A I/F is the interface established by the Personal Computer Memory Card International Association.

Further, in the Prior Art which is disclosed in the Japanese Patent Application Laid-Open No. HEI 2-279032, and which is disclosed in the Japanese Patent Application Laid-Open No. HEI 5-130012, there is not supposed the case where it causes the portable digital telephone to be used in the packet communication. There is intended to design low power consumption by using power source provided for the portable digital telephone, however, it is incapable of achieving the problem that the packet communication is impossible because the battery of the portable digital telephone consumes.

SUMMARY OF THE INVENTION

In view of the foregoing, it is an object of the present invention in order to achieve the above-mentioned problems to provide a packet communication card which enables consumption of the battery of the portable digital telephone to be reduced by changing supply power to the portable digital telephone in accordance with the state of the portable digital telephone in the packet communication card for use in the packet communication.

According to the first aspect of the present invention, in order to achieve the above-mentioned object, there is provided a packet communication card which is connected to a portable digital telephone, and which is provided with a COM port necessary for implementing a packet communication, and which is inserted into a data terminal equipment to be used, wherein there is reduced consumption of a battery of the portable digital telephone by selecting to be changed one power source of power sources which are at least more than one, for supplying power to the portable digital telephone based on a state of communication of the portable digital telephone.

According to the second aspect of the present invention, there is provided a packet communication card, wherein there is provided with a switch for implementing a change of power source into said one power source.

According to the third aspect of the present invention, there is provided a packet communication card, wherein there is provided with a control section for controlling the change of power source into this one power source.

According to the fourth aspect of the present invention, there is provided a packet communication card, wherein a state of communication of the portable digital telephone includes an active state of packet communication.

According to the fifth aspect of the present invention, there is provided a packet communication card, wherein a state of communication of the portable digital telephone includes a stand by state of packet communication.

According to the sixth aspect of the present invention there is provided a packet communication card, wherein a state of communication of the portable digital telephone includes a waiting state of voice service.

According to the seventh aspect of the present invention there is provided a packet communication card, wherein a state of communication of the portable digital telephone includes a state of out of service area of the voice service.

According to the eighth aspect of the present invention there is provided a packet communication card, wherein a state of communication of the portable digital telephone includes a service state of the voice service.

According to the ninth aspect of the present invention, there is provided a packet communication card, wherein there is provided one power source which is integrated into the portable digital telephone for supplying power to the portable digital telephone, is a power source of power sources which are at least more than one, for the sake of supply power of the portable digital telephone use.

According to the tenth aspect of the present invention, there is provided a packet communication card, wherein there is provided one power source which is integrated into the data terminal equipment for supplying power to the portable digital telephone, is a power source of power sources which are at least more than one, for the sake of supply power of the portable digital telephone use.

According to the eleventh aspect of the present invention, there is provided a packet communication card, wherein there is provided with a PCMC I A (Personal Computer Memory Card International Association) I/F (Inter Face) for supplying the power source integrated into the data terminal equipment to the packet communication card.

According to the twelfth aspect of the present invention, there is provided a packet communication card, wherein a serial signal is transmitted in relation to the portable digital telephone so that it causes the state of communication to be recognized in connection with the portable digital telephone.

According to the thirteenth aspect of the present invention, there is provided a packet communication card, wherein the change into one power source is implemented based on the state of communication of the portable digital telephone and also based on demand of packet communication from the data terminal equipment, the one power source is a power source of power sources which are at least more than one, for the sake of supply power of the portable digital telephone use.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 2 is a view showing a signal line and terminal which are connected to the packet communication card shown in FIG. 1;

FIG. 3 is a flowchart showing operation of the packet communication system shown in FIG. 1.

DETAILED DESCRIPTION OF THE PREFERRED EMBODIMENT

Figure 1:
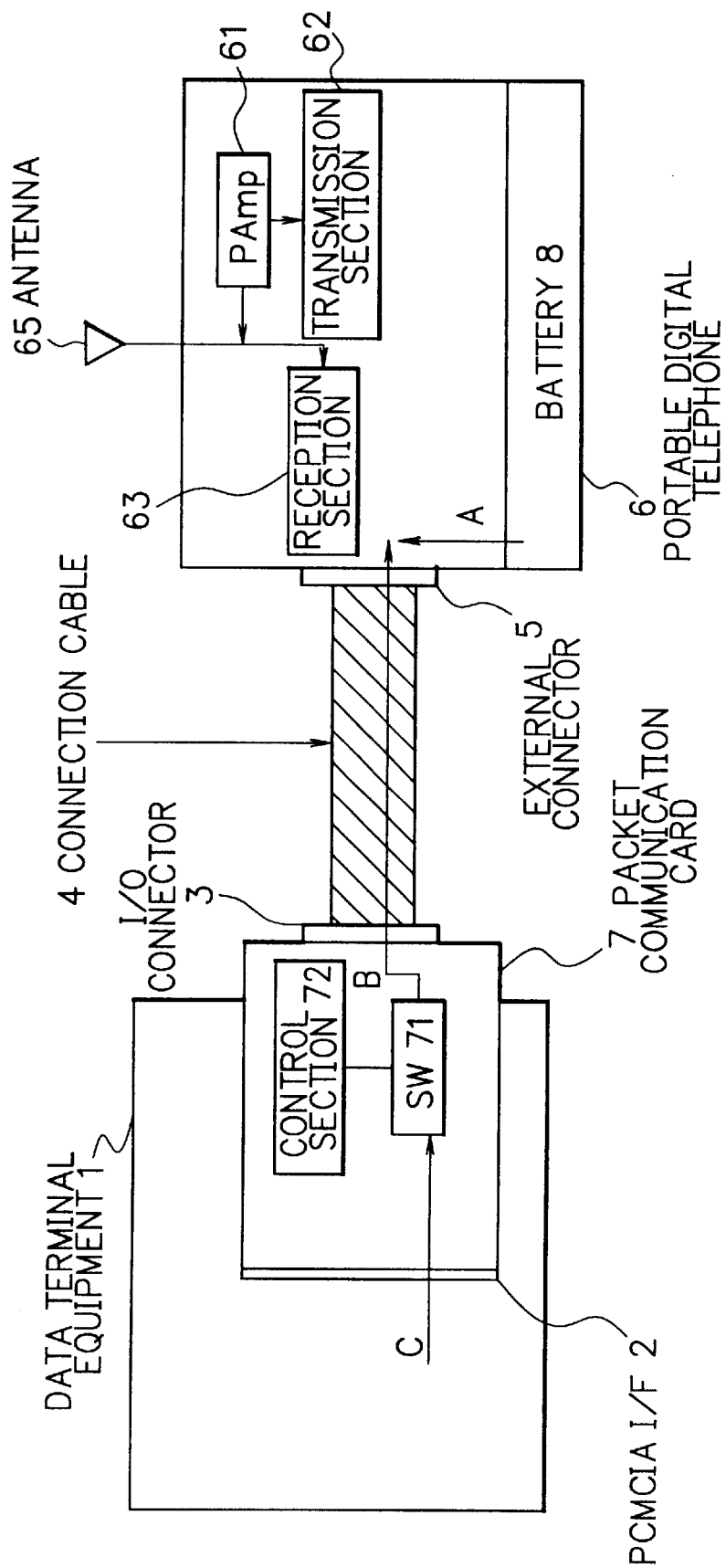
FIG. 1 is a block diagram showing a configuration a packet communication system using one embodiment of a packet communication card according to the present invention.

A preferred embodiment of the packet communication card according to the present invention will be described in detail in accordance with the accompanying drawings. FIG. 1 is a block diagram showing a configuration of a packet communication system using one embodiment of a packet communication card according to the present invention.

As shown in FIG. 1, the packet communication card 7 is provided with a switch (in FIG. 1 referring to SW) 71 for changing the power source supplying power to a portable digital telephone 6, a control section 72 for controlling operation of the switch 71, a PCMC I A I/F 2, and an I/O connector 3.

Further, the packet communication card 7 is inserted into the DTE 1 as shown in FIG. 1. The DTE 1 is provided with a own power source (not illustrated).

Furthermore, the packet communication card 7 is connected to the portable digital telephone 6 through an external connector 5.

The portable digital telephone 6 is provided with the external connector 5, a battery 8 to be the power source its' own, a power amplifier (in FIG. 1 referring to P Amp) 61, a transmission section 62, reception section 63, and an antenna 65.

Next, there will be described operation of the packet communication system using the packet communication card according to the present invention shown in FIG. 1.

The power source is supplied to the packet communication card 7 through the PCMC I A I/F 2 from the DTE 1 (for instance note-type personal computer and so forth). The supply of the power source is implemented from the battery 8 generally in terms of the portable digital telephone 6. (an arrow A)

Here, there will be described detection of connection between the DTE 1 and the packet communication card 7. As shown in FIG. 1, the DTE 1 implements detection of connection thereof by scanning CIS of the packet communication 7 through the PCMC I A I/F 2 when the packet communication card is inserted to be connected thereto. Subsequently, there is implemented arrangement of configuration for the sake of operation of the packet communication card 7 use by way of extended COM port.

Further, the supply of the power source from the DTE 1 to the packet communication card 7 is implemented such that it causes the power source to be supplied to the switch 71 from the power source (not illustrated) provided with the DTE 1 (an arrow C).

The portable digital telephone 6 is a portable digital telephone which is capable of implementing at least one of the voice service and the packet communication. Further, there is taken the state in which there is a transmission data in the state of voice service and in the state of packet communication, or there is a receiving data in the state of voice service and in the state of packet communication to be active state.

In this active state, since the portable digital telephone 6 is necessary to use the power amplifier 61 (P Amp), thus the power consumption becomes considerably large.

On the other hand, in the state of waiting, in the state of out of service area, or stand by state where there is no data nevertheless while packet communicating, the power source supplying to the transmission section 62 on the inside of the portable digital telephone 6 is cut, and supply of the power source to the reception section 63 is implemented intermittently, therefore, the power source which is necessitated by the portable digital telephone is capable of being suppressed by far in comparison with the state of on communicating.

Here, there will be described the signal line and the terminal which are provided for the external connector 5 and the packet communication card 7 which are connected to each other through the connection cable 4 in accordance with FIG. 2. As shown in FIG. 2, the signal line provided for the packet communication card 7 is a signal line for changing two pieces of serial lines into one piece thereof, and the terminal provided for the external connector 5 is a terminal for implementing supply of power source of the portable digital telephone from the external side.

The above-described signal line is a signal line for informing present state of the portable digital telephone to the packet communication card 7. Furthermore, as shown in FIG. 2, an up-serial signal flows into the serial signal line transferring the up-serial signal from the packet communication card to the portable digital telephone, and a down-serial signal flows into the serial signal line transferring the down-serial signal from the portable digital telephone to the packet communication card.

Furthermore, power source inside-outside discrimination signal flows the signal line changing the supply power of the power source of the portable digital telephone by the inside (battery) or by the outside, and an external power source supply signal is inputted to the terminal when there is implemented supply power of the power source of the portable digital telephone.

The packet communication card 7 shown in FIG. 1 judges state of the portable digital telephone 6 based on the signal flowing through the signal line.

By way of the state of the portable digital telephone, there are the state of packet communication and the active state, the state of packet communication and the stand by state, the state of waiting, the state of out of service area, and the state of call and so forth. However, the packet communication card of the present invention enables change of the supply power to be implemented while judging the various state of the portable digital telephone in terms of the matters with the exception of above stated respective states, while since the invention is not restricted above respective states.

Thus, when the portable digital telephone is particularly in the state of out of service area, in the state of waiting, or in the state of packet communication and stand by state, while judging these states, the control section 72 of the packet communication card 7 feeds the power source fed from the DTE 1 into the portable digital telephone 6 through the PCMC I A I/F 2 while controlling the switch 71 (an arrow B).

Next, there will be described hereinafter in detail the packet communication system using one embodiment of the packet communication card according to the present invention shown in FIG. 1.

Referring to FIG. 1, the power source is supplied from the DTE 1 through the PCMC I A I/F 2 on the ground that the packet communication card 7 is inserted into the DTE 1 (an arrow C).

Furthermore, the packet communication card 7 is recognized by way of I/O card after insertion, thus being arranged configuration for the sake of operation thereof so as to be seen by way of the extended COM port seeing from the DTE 1.

Moreover, as shown in FIG. 1, the packet communication card 7 is provided with the control section 72. The control section 72 is provided with a COM port (not illustrated) which is necessary for the packet communication. The control section 72 implements analysis of received data from the DTE 1 through the COM port, thus transmitting it to the portable digital telephone 6. Or the control section 72 implements transmission of the data received from the portable digital telephone 6 through the COM port.

Moreover, the packet communication card is provided with the switch 71 described above. The switch 71 changes the power source fed from the DTE 1 through the PCMC I A I/F 2 so as to output to an external power source terminal of the external connector 5 of the portable digital telephone 6 (an arrow B).

The switch 71 is constituted such that control of ON/OFF is capable of being implemented by the control section 72, and the initial value becomes OFF. Here, with respect to the switch 71 shown in FIG. 1, when the switch 71 is ON, it becomes the connection (an arrow B) in which the power source is fed into the portable digital telephone 6 from the DTE 1, while when the switch 71 is OFF, it becomes the connection (an arrow A) in which the power source is fed into the portable digital telephone 6 from the battery.

Further, the portable digital telephone 6 is generally fed from the battery 8, however, it is capable of being fed the power source from the external power source supply terminal of the external connector 5 by controlling connection of the power source inside-outside discrimination terminal of the external connector 5 toward the external side.

Next, there will be described one example of operation of the packet communication system using one embodiment of the packet communication card shown in FIG. 1 referring to FIG. 3. FIG. 3 is a flowchart showing operation of the packet communication system shown in FIG. 1.

Firstly, the power source is to be ON (STEP S1), the packet communication card 7 is recognized by DTE 1 by way of the COM port (STEP S3), the control section 72 applies the up-signal to the portable digital telephone 6 (STEP S5).

Subsequently, the control section 72 confirms whether or not ack signal is received by way of the signal informing operation being completed from the portable digital telephone 6 (STEP S7). When there is no ack signal (No), being shifted to STEP S15, thus recognizing the portable digital telephone to be disconnection state, before the operation is terminated.

In the confirmation of STEP S7, when there is the ack signal (Yes), being shifted to STEP S9, subsequently, in the STEP S9, thus being implemented confirmation whether or not there is packet (PKT) communication function in the portable digital telephone.

When there is no the packet communication function (No), being shifted to STEP S17, thus there is implemented the confirmation whether or not it is in the state of service. In this confirmation, when it is not in the state of service (No), being shifted to STEP S19, there is regarded the state of the portable digital telephone to be the state of out of service area, the state of waiting or the like, thus rendering the switch 71 ON, namely, it causes the power source to be fed from the DTE 1 to the portable digital telephone 6.

Further, in the confirmation of STEP S17, when it is in the state of service (Yes), being shifted to STEP S13, thus rendering the switch 71 to be ON, namely, causing the power source to be fed from the own battery 8 to the portable digital telephone 6.

In the confirmation of STEP S9, when there is provided with the packet communication function (Yes), being shifted to STEP S11, thus confirming whether or not the packet communication is active. When the packet communication is active (Yes), being shifted to STEP S13, thus rendering the switch 71 to be OFF, subsequently, the operation is terminated.

In the confirmation of STEP S11, when the packet communication is not active (No), being shifted to STEP S21, in the STEP S21, thus confirming whether or not it is in the state of service.

In the confirmation of STEP S21, when it is in the state of service (Yes), being shifted to STEP S13, rendering the switch 71 to be OFF, thus terminating operation.

In the confirmation of STEP S21, when it is not in the state of service (No), being shifted to STEP S23, there is regarded the state of the portable digital telephone is in the state of out of service area, in the state of waiting, or in the state of packet communication and the stand by state, thus rendering the switch 71 to be ON, namely, causing the power source to be fed from the DTE 1 to the portable digital telephone 6.

There will be described in detail the respective operations shown in the above flowchart referring to FIGS. 1, 2, and 3. The packet communication 7 is inserted into the DTE 1, thus the supplying power source is implemented from the DTE 1 through the PCMC I A I/F 2 (STEP S1), and the DTE 1 implements arrangement of the configuration for the sake of operation of the packet communication card 7 by way of the extended COM port by scanning CIS (card information structure) of the packet communication card.

The packet communication card 7 is recognized as the I/O card (STEP S3), before the packet communication card 7 transmits the serial signal to the portable digital telephone 6 through the serial signal line (FIG. 2) connected to the I/O connector 3 in order to judge whether or not the portable digital telephone is connected, and whether or not the portable digital telephone 6 is a portable digital telephone capable of being implemented the packet communication (STEP S5). When there is not received the ack signal in terms of the up-signal, the portable digital telephone is in the state of disconnection (STEP S15), thus being not implemented the control for the switch 71.

Next, there is confirmed the classification of the portable digital telephone 6 (STEP S9), when the portable digital telephone is not equivalent to the PKT (packet) communication, judging the state of the portable digital telephone whether it is in the state of service or it is in the state of out of service area, in the state of waiting, or the like, when it is in the state of service, it causes the control to be not implemented in relation to the switch 71 (STEP S17).

When it is in the state of out of service area, in the state of waiting or the like, rendering the switch 71 to be ON (STEP S19), thus there is set the power source inside-outside discrimination terminal of the portable digital telephone to the outer section. In this state, since the power source is fed to the portable digital telephone 6 from the external power source terminal of the external connector 5 instead of the battery 8 so that capacity of the battery is not consumed.

Figure 4:
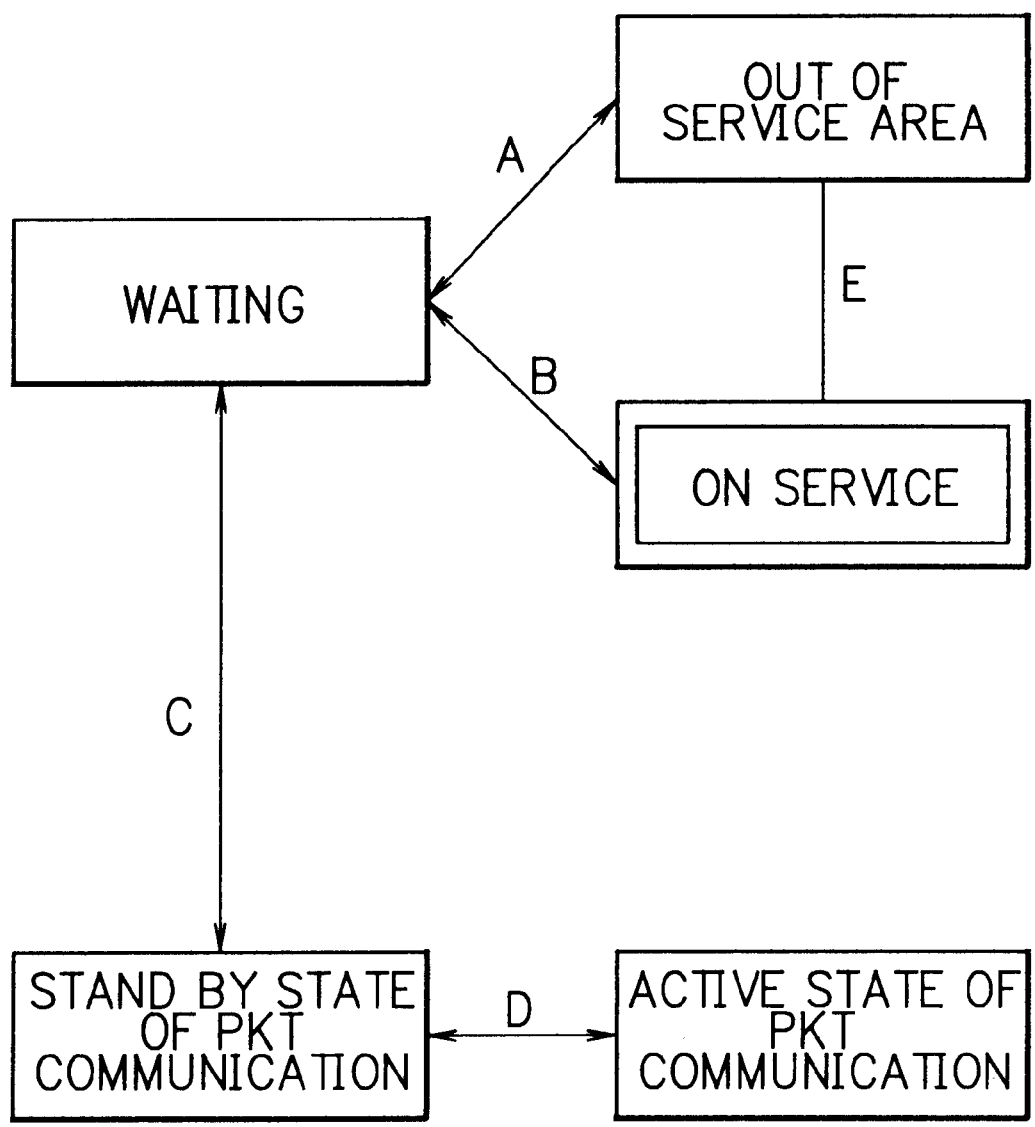
FIG. 4 is a view showing a transition state of the portable digital telephone used in the packet communication system shown in FIG. 1.

Here, there will be described the case when there is demand of outgoing from the DTE 1 by ATD command and so forth. The transition of this state corresponds to the route B or the route E in the transition of respective states shown in FIG. 4. FIG. 4 is a state transition view showing respective states of the portable digital telephone. However, the state surrounded by double solid line of the states shown in FIG. 4 (in the state of service, in the state of PKT service and active state) is the state of being fed the power source from the own battery 8.

Next, in STEP S7, when there is received the serial signal of incoming from the portable digital telephone 6, it causes the power source inside-outside discrimination terminal to be changed into the internal section, subsequently, there is set the switch 71 to be OFF, before transmitting up-serial signal of off-hook to the portable digital telephone.

Then, the portable digital telephone is shifted to the state of voice communication, thus supply power of the power source is implemented from the battery 8. When there is detected circuit disconnection in the state of voice communication (route B, route E), rendering the switch 71 to be ON, thus establishing the power source inside-outside discrimination terminal of the portable digital telephone 6 to the terminal for outside use.

Next, there will be described the state transition to the packet communication from the state of waiting. The state transition corresponds to the route C of the routes shown in FIG. 4.

When there is a demand of packet outgoing from the DTE 1 by the ATD command and so forth, it causes the power source inside-outside discrimination terminal to be changed into the terminal for inside use, then establishing the switch 71 to be OFF, before transmitting the up-serial signal of the OFF-hook to the portable digital telephone 6.

Subsequently, the portable digital telephone 6 is shifted to the state of packet communication (route D), However, in this state, when there is no data for transmitting from the DTE 1 or there is no data for receiving from the other party for the packet connection during definite time, the portable digital telephone 6 is shifted in the state of packet communication and active state to the state of stand by (route D).

When the portable digital telephone 6 detects that the portable digital telephone 6 is shifted to the stand by state, it causes the switch 71 to be ON, thus establishing the power source inside-outside discrimination terminal of the portable digital telephone 6 to the terminal for outside use.

Depending on the above described constitution and operation, in one embodiment of the packet communication card according to the present invention shown in FIG. 1, it enables consumption of the battery of the portable digital telephone to be reduced, because it causes the power source to be changed such power source is supplied to the portable digital telephone in accordance with the state of communication for the portable digital telephone.

As is clear from the above description, according to the embodiment of the present invention, if the state of the portable digital telephone is of the fixed state in which it is in the state of out of service area, in the state of waiting, and in the state of stand by of packet communication, it causes the supply of the power source to the portable digital telephone to be implemented from the DTE (data terminal equipment), therefore, there can be provided the packet communication card capable of reducing consumption of the battery which is included in the portable digital telephone.

Further, since there is implemented supply of the power source for the portable digital telephone from the DTE (data terminal equipment) in accordance with the state of the portable digital telephone, there can be provided the packet communication card capable of using the battery efficiently while allocating whole capacity of the battery for the sake of communication (voice communication, packet communication), such battery is included in the portable digital telephone.

In particular, according to the first aspect of the present invention, since there is selectively changed the power source for supplying power source to the portable digital telephone in accordance with the state of communication for the portable digital telephone, there can be provided the packet communication card capable of reducing consumption of the battery for the portable digital telephone.

Further, according to the second aspect of the present invention, there is obtained the same effect as that of the first aspect, together with, since there is provided the switch for changing to one power source, there can be provided the packet communication card capable of executing surely the change of the power source.

Furthermore, according to the third aspect of the present invention, there is obtained the same effect as that of the second aspect, together with, since there is provided the control section for controlling the change of the switch, there can be provided the packet communication card capable of implementing accurately the supply of the power source in accordance with the state of communication of the portable digital telephone.

Moreover, according to the fourth aspect of the present invention, there is obtained the same effect as that of any one of the first to the third aspects, together with, since the state of the communication of the portable digital telephone includes the active state of packet communication, for instance, in the active state of the packet communication, there can be provided the packet communication card capable of implementing efficiently utilization of the battery for the portable digital telephone, further capable of reducing consumption of the battery for the portable digital telephone.

Moreover, according to the fifth aspect of the present invention, there is obtained the same effect as that of any one of the first aspect to the fourth aspect, together with, since the state of the communication of the portable digital telephone includes the active state of packet communication, for instance, in the stand by state of the packet communication, there can be provided the packet communication card capable of implementing efficiently utilization of the battery for the portable digital telephone, further, capable of reducing consumption of the battery for the portable digital telephone by utilizing the power source of the data terminal equipment.

Moreover, according to the sixth aspect of the present invention, there is obtained the same effect as that of any one of the first to the fifth aspects, together with, since the state of the communication of the portable digital telephone includes the state of waiting in the voice call, there can be provided the packet communication card capable of implementing efficiently utilization of the battery for the portable digital telephone, further, capable of reducing consumption of the battery for the portable digital telephone by utilizing the battery of the data terminal equipment.

Moreover, according to the seventh aspect of the present invention, there is obtained the same effect as that of any one of the first to the sixth aspects, together with, since the state of communication of the portable digital telephone includes the state of out of service area in the voice call, for instance, in the state of out of service area of the voice service, there can be provided the packet communication card capable of implementing efficiently utilization of the battery for the portable digital telephone, further, capable of reducing consumption of the battery for the portable digital telephone by utilizing the battery of the data terminal equipment.

Moreover, according to the eighth aspect of the present invention, there is obtained the same effect as that of any one of the first to the seventh aspects, together with, since the state of communication of the portable digital telephone includes the state of service in the voice service, for instance, in the state of service in the voice service, there can be provided the packet communication card capable of implementing efficiently utilization of the battery for the portable digital telephone, further capable of reducing consumption of the battery for the portable digital telephone by utilizing the battery for the portable digital telephone.

Moreover, according to the ninth aspect of the present invention, there is obtained the same effect as that of any one of the first to the eighth aspects, together with, since one power source of the power sources which are at least more than one for supplying power to the portable digital telephone is the power source included in the portable digital telephone, there can be provided the packet communication card capable of selecting to be utilized the power source included in the portable digital telephone.

Moreover, according to the tenth aspect of the present invention, there is obtained the same effect as that of any one of the first to the ninth aspects, together with, since one power source of the power sources which are at least more than one for supplying power to the portable digital telephone is the power source included in the data terminal equipment, there can be provided the packet communication card capable of utilizing the power source included in the data terminal equipment.

Moreover, according to the eleventh aspect of the present invention, there is obtained the same effect as that of the tenth aspect, together with, since there is provided the PCMC I A I/F for supplying power source included in the data terminal equipment to the packet communication card, there can be provided the packet communication card capable of implementing easily supply of the power source from the data terminal equipment.

Moreover, according to the twelfth aspect of the present invention, there is obtained the same effect as that of any one of the first to the eleventh aspects, together with, since there is recognized the state of communication of the portable digital telephone by transmitting the serial signal in relation to the portable digital telephone, there can be provided the packet communication card capable of recognizing more surely the state of the portable digital telephone.

Moreover, according to the thirteenth aspect of the present invention, there is obtained the same effect as that of any one of the first to the twelfth aspects, together with, there is also implemented the change into one power source of the power sources which are at least more than one for supplying the power source to the portable digital telephone based on the packet communication demand from the data terminal equipment, when the data terminal equipment requires to execute the packet communication even though the state of the portable telephone is of whichever states, there can be provided the packet communication card capable of implementing the packet communication while performing efficiently utilization of the battery of the portable digital telephone, further capable of reducing consumption of the battery for the portable digital telephone by changing power source.

What is claimed is:

1. A packet communication card that is inserted into a data terminal equipment to be used for connection to a portable digital telephone, wherein said card comprises:
    a COM port for implementing packet communication;
    a signal line for receiving information on the state of communication of said portable digital telephone; and
    means for selectively changing the power source of said portable digital telephone from a battery of said portable digital telephone to at least one other power source, wherein the changing to the at least one other power source is based on the state of communication of said portable digital telephone received by said signal line.

2. A packet communication card as claimed in claim 1, wherein said means for selectively changing the power source comprises a switch for implementing said changing of power sources to said at least one other power source.

3. A packet communication card as claimed in claim 1, further comprising a control section for controlling said changing of power sources.

4. A packet communication card as claimed in claim 1, wherein said state of communication of said portable digital telephone includes an active state of packet communication.

5. A packet communication card as claimed in claim 1, wherein said state of communication of said portable digital telephone includes a stand by state of packet communication.

6. A packet communication card as claimed in claim 1, wherein said state of communication of said portable digital telephone includes a waiting state of voice service.

7. A packet communication card as claimed in claim 1, wherein said state of communication of said portable digital telephone includes a state of out of service area of the voice service.

8. A packet communication card as claimed in claim 1, wherein said state of communication of said portable digital telephone includes a service state of the voice service.

9. A packet communication card as claimed in claim 1, wherein said other power source comprises a power source which is integrated into said data terminal equipment for supplying power to said portable digital telephone.

10. A packet communication card as claimed in claim 9, further comprising a PCMCIA (Personal Computer Memory Card International Association) I/F (Inter Face) for supplying the power source integrated into said data terminal equipment to said packet communication card.

11. A packet communication card as claimed in claim 1, wherein said portable digital telephone transmits a serial signal that causes the state of communication of said portable digital telephone to be recognized.

12. A packet communication card as claimed in claim 1, wherein said changing to the at least other power source is also based on demand of packet communication from said data terminal equipment.

13. A packet communication card as claimed in claim 1, wherein said power source of the portable digital telephone is used as the power source of the portable digital telephone when the state of communication of the portable digital telephone is of an active state of packet communication.

14. A packet communication card as claimed in claim 1, wherein a power source of the data terminal equipment is used as the power source of the portable digital telephone when the state of communication of the portable digital telephone is of a stand by state of packet communication.

15. A packet communication card as claimed in claim 1, wherein a power source of the data terminal equipment is used as the power source of the portable digital telephone when the state of communication of the portable digital telephone is of a waiting state of voice service.

16. A packet communication card as claimed in claim 1, wherein a power source of the data terminal equipment is used as the power source of the portable digital telephone when the state of communication of the portable digital telephone is of a state of out of service area of voice service.

* * * * *